Aug. 13, 1940.  G. H. BORK  2,210,890
HEATING APPARATUS
Filed Jan. 5, 1939
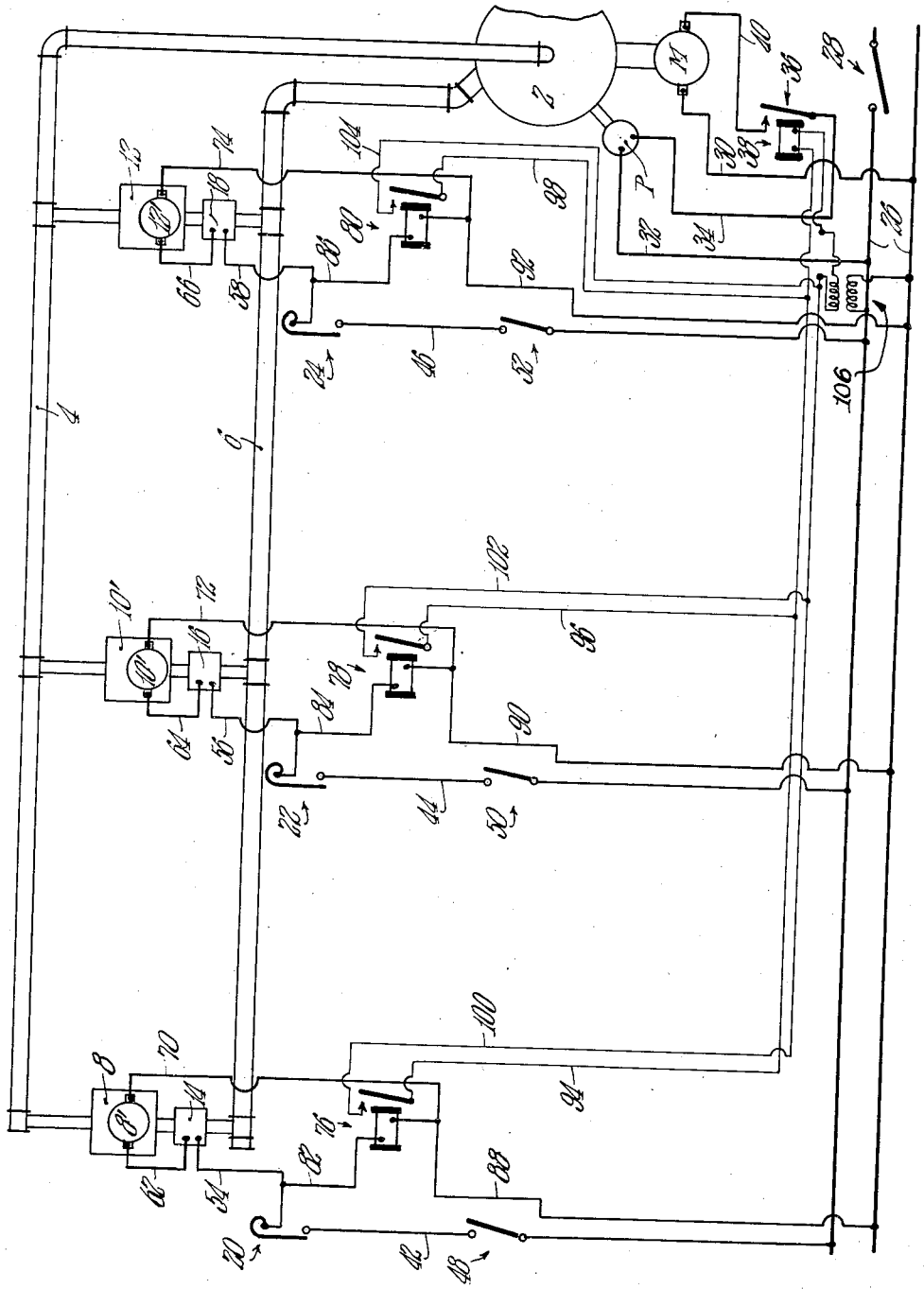
INVENTOR.
George H. Bork.
BY Walter C. Ross.
ATTORNEY.

Patented Aug. 13, 1940

2,210,890

UNITED STATES PATENT OFFICE 2,210,890

HEATING APPARATUS

George H. Bork, Holyoke, Mass., assignor to Harvey-Whipple, Inc., Springfield, Mass., a corporation of Massachusetts Application January 5, 1939, Serial No. 249,444

2 Claims. (Cl. 236—1)

My invention relates to improvements in heating apparatus and the principal objects thereof are directed to heating apparatus which includes means for controlling and supplying heat to separate compartments or rooms. A control means is provided which is adapted and arranged whereby heat may be supplied to one or more separate rooms from a single central heating plant according to the individual requirements of each separate room.

Heretofore, it has been known to supply heat to separate rooms from a main heating plant by means of controls for each room which operate the flow of the heating medium and these have been operable by thermostats in said rooms. This arrangement, is costly however, and furthermore the heating plant is necessarily in continuous operation in order to provide a supply of heat which is in readiness as and when required by the control for the different individual rooms.

According to this invention, the heating plant is in operation only when a certain room or a plurality thereof require heat.

The novel features of the invention are adapted for use in connection with steam, hot-water, hot-air, and other generally well-known types of apparatus, but for purposes of disclosure the invention will be described in connection with a steam plant.

Various other objects and advantages of the invention will be apparent from the following description of the preferred form of the invention taken in connection with the accompanying drawing wherein:

The figure is a diagrammatic plan view of one form of the heating apparatus embodying the novel features of the invention.

Referring to the drawing more in detail, the invention will now be described.

A heating plant is represented by 2 which, in the form of the invention shown, is a steam boiler. A steam supply line from the boiler is represented by 4 and a return line for the condensate is represented by 6. The boiler may be fired by any well-known means, but an oil burner has been found to be very satisfactory and there is shown therefor a motor M for operating the same.

A pressure-control device which is connected to the boiler is represented by P. This may be of the well-known type which is so operated by pressure in the boiler as to open and close a switch of a circuit for the motor M. It is the usual procedure to set the control device P so that as the pressure in the boiler and the system reaches a certain desired point, the motor circuit is opened by the opening of the switch. This control acts as a safety device to shut off the oil burner when a certain pressure has been reached.

The apparatus may be used for heating any number of separate rooms or compartments, but for purposes of illustration, the apparatus herein described is suitable for heating and is adapted to heat a three room apartment or the like, there being shown heating units, such as 8, 10, and 12, with one for each of the said rooms. There may be more than one such unit in a room if it is desired.

Each of the heating units 8, 10 and 12 preferably consist of a radiator which is connected to a steam supply by means of line 4 and also to the return line 6 so that condensate may be returned to the boiler 2. For each heating unit, there is a fan or blower driven by an electric motor represented by 8', 10', and 12'. When the motors are in operation, the fans or blowers cause air to be passed by or through the radiators and out into the room so that by means of heated radiators, warm or heated air is delivered into the room. These heating units may be referred to as electrically driven heating units.

It is desired, according to the invention, that the motors and fans be operated only when the radiators associated therewith are of a predetermined temperature so that warm or heated air only is delivered. To that end, control devices indicated by 14, 16, and 18 are disposed in the connections between the radiators and the steam line, preferably between the radiators and the return line 6.

These control devices may take the form of aquastats which include temperature sensitive elements and switches operable thereby. Such devices are adjustable so that the switches are opened and closed at predetermined temperatures. When an aquastat is set for a certain temperature, the circuit including the motor of the heating unit and the aquastat switch remains open until the certain temperature has been attained, and then on the closing of the circuit, the fan motor of the heating unit is operative.

This insures that the heating units will deliver only warm air, or at least air which has been heated only after the radiator is heated to a certain desired temperature or to the temperature at which the aquastats are set.

For each room and heating unit therefor, there is a thermostat which is indicated herein by 20, 22 and 24. Such thermostats are preferably of the type which open and close a circuit and for that purpose they have temperature sensitive elements and switches operable thereby. The thermostats are adjustable and may be set so as to close the switch when the temperature reaches a certain low temperature and to open the switch when the temperature of the room reaches a certain higher temperature.

When a thermostat in a certain room demands heat, the boiler firing motor is operated subject to the pressure device P while the heating unit for that particular room is operated subject to the control of an aquastat so that heat is delivered thereto. If it is desired, the thermostats may be adjusted independently of each other so that different temperatures may be maintained in the different rooms.

An electric supply line is represented by 26 which may be the usual 110 volts A. C. circuit associated therewith is a switch 28. One side of the supply line is connected as by 30 to the motor M. The other side of the supply line is connected as by 32 to one side of the pressure control device P while the other side of the pressure control is connected by 34 to the movable member 36 of a relay 38. A connection 40 extends from the motor M to the relay 38.

When the switch 28 is in circuit closing position, and when the relay 38 is energized, a circuit, connected to the supply line and including therein the motor M and the pressure control device P, is completed so that under the control of the pressure control device P, the motor M may be operated. If the boiler has attained a certain pressure, the switch of the pressure control apparatus P remains open so that motor M is not operable. During the operation of the motor M, when the boiler pressure reaches the point for which the device P is set, the circuit is opened so that the motor M is cut out and made inoperable again. The motor operates so long as any room thermostat requires heat and the pressure for which pressure device P is adjusted has not been reached.

Each one of the thermostats 20, 22, and 24 have a side connected as by connections 42, 44, and 46 respectively through switches 48, 50, and 52 respectively to a side of the supply line 26. The other side of the thermostats are connected by 54, 56 and 58 respectively to a side of the aquastats 14, 16, and 18 respectively. Connections 62, 64 and 66 respectively extend between the other sides of the aquastats and a side of the heating unit motors 8', 10', and 12' respectively. The other side of said motors are connected by 70, 72 and 74 respectively to a side of relays 76, 78, and 80 respectively. The other sides of said relays are connected by 82, 84, and 86 respectively to the thermostats and the relays are connected by 88, 90 and 92 respectively to the supply line 26.

The arms and contacts of the relays 76, 78 and 80 are connected to the relay 38 by connections 94, 96, 98, respectively and 100, 102, and 104 respectively. The circuit including the relay 38 may be a low voltage circuit and for that purpose it may be energized through a transformer 106 which is connected in said low voltage circuit and is also connected in the power circuit.

As will be observed the relay 38 is energized by operation of any one of the relays 76, 78 or 80, and the latter relays are put in circuit by their respective thermostats, which thermostats are independently operable.

It will be assumed that switch 28 is closed and that each of the switches 48, 50 and 52 are closed. The motor M, as explained, is controlled in its operation by the relay 38 subject, however, to the control of the pressure device P.

Each one of the thermostats may be set for the same or different temperatures according to the temperature it is desired to maintain in the rooms in which the groups of apparatus are located.

If it is assumed that thermostat 20 is set for seventy (70) degrees the said thermostat will close its switch when the room temperature reaches the neighborhood of that temperature and will remain closed until the temperature has been raised to that for which the thermostat is adjusted. When the thermostat 20 operates to close its switch the circuit or circuits including relays 26 and 38 are closed so that the circuit for motor M is completed except that it may open the switch of pressure device P. If the switch of pressure device P is open the motor M is not operated and the closing of the relay circuits has no effect. If the pressure is less than that for which the device P is set the switch thereof is closed so that on completing of the relay circuits, motor M is caused to operate.

If the temperature in the connection between heating unit 8 and return line 6 is such that the switch of aquastat 14 is closed the closing of the switch of thermostat 20 causes the circuit of motor 8' of the heating unit 8 to operate so that the fan thereof operates and heated or warm air is delivered. If the temperature, however, is below that for which the aquastat is adjusted, the aquastat switch remains open and motor 8' is not operated until the boiler raises the temperature to that for which the aquastat is adjusted. In this way the motor of the heating unit operates only to deliver warm or heated air.

The thermostats may be adjusted for different temperatures or the same temperatures so that the same or different temperatures may be maintained in different rooms. Also the aquastats may be adjusted for different temperatures so that the heating units will deliver warm air when the temperature for which the aquastats are set has been attained.

The boiler is in operation only as one or more thermostats call for heat subject, however, to the control of the pressure device P and the heating units are operated on closing of the thermostat switches subject to the control of the aquastats.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

1. Heating apparatus comprising in combination, a main heating plant having a main motor, supply pipes leading from said plant, separate heating units each having a motor driven fan associated therewith, permanently open pipe connections between each of said heating units and said supply pipes whereby said units are in communication with said plant at all times, a current supply line for said main motor, a relay in said line, a unit relay for each heating unit, a thermostat for each of said heating units circuit connections for the associated unit relays and thermostats and the main relay whereby said main motor may be operated by any one of said thermostats to deliver heating medium into said units, an aquastat in said pipe connections for each of said heating units, and circuit connections between the thermostat, aquastat, and fan motor associated with each of said heating units whereby said fan motors are primarily controlled by the thermostats and secondarily by the aquastats.

2. Heating apparatus comprising in combination, a main heating plant having a main motor, supply pipes leading from said plant, separate heating units each having a motor driven fan, a thermostat for each unit, a main current supply circuit including a main relay, a unit relay for each unit, open pipe connections between said units and supply pipes, separate connections between the unit relay and thermostat for each unit connected to said main relay and supply circuit whereby any one thermostat is operable to put the main motor in operation so that heating medium is delivered to all of the heating units, an aquastat in the connection for each heating unit and supply pipes, and separate connections for the aquastat, motor driven fan and thermostat for each heating unit whereby the said motor driven fan is under the control of the aquastat and thermostat when the thermostat has put the main motor in operation.

GEORGE H. BORK.